United States Patent
Merklein et al.

(10) Patent No.: US 6,283,733 B1
(45) Date of Patent: Sep. 4, 2001

(54) PISTON PUMP FOR A VEHICLE BRAKE SYSTEM

(75) Inventors: Dieter Merklein, Kempten; Siegfried Fritsch, Sonthofen; Ralf Zitzelsberger, Marktoberdorf; Andreas Weh, Durach; Michael Hellebrandt, Burgberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,571

(22) PCT Filed: Jun. 5, 1998

(86) PCT No.: PCT/DE98/01531

§ 371 Date: Oct. 29, 1999

§ 102(e) Date: Oct. 29, 1999

(87) PCT Pub. No.: WO99/06705

PCT Pub. Date: Feb. 11, 1999

(30) Foreign Application Priority Data

Jul. 30, 1997 (DE) .............................. 197 32 792

(51) Int. Cl.[7] .............................. F04B 39/10; F04B 53/12
(52) U.S. Cl. .................................. 417/549; 92/78
(58) Field of Search ..................... 417/545, 549, 417/554, 454, 503; 303/116.4; 92/78

(56) References Cited

U.S. PATENT DOCUMENTS

| | | | |
|---|---|---|---|
| 5,232,273 | * 8/1993 | Eckstein et al. | 303/116.4 |
| 5,540,570 | * 7/1996 | Schuller et al. | 417/545 |
| 5,567,135 | * 10/1996 | Mueller et al. | 417/549 |
| 5,588,817 | * 12/1996 | Zirps et al. | 417/549 |
| 5,688,113 | * 11/1997 | Bareiss et al. | 417/549 |
| 5,823,639 | * 10/1998 | Zinnkann et al. | 303/116.4 |
| 5,897,303 | * 4/1999 | Mueller | 417/549 |
| 5,944,498 | * 8/1999 | Wupper et al. | 417/554 |
| 5,984,651 | * 11/1999 | Beck et al. | 417/503 |
| 5,988,997 | * 11/1999 | Siegel | 417/554 |
| 6,000,764 | * 12/1999 | Dokas | 303/116.4 |
| 6,079,961 | * 6/2000 | Schuller et al. | 417/549 |
| 6,082,244 | * 7/2000 | Siegel et al. | 92/78 |

* cited by examiner

Primary Examiner—Teresa Walberg
Assistant Examiner—Leonid Fastovsky
(74) Attorney, Agent, or Firm—Ronald E. Greigg; Edwin E. Greigg

(57) ABSTRACT

A piston pump which is intended for use in a vehicle for a hydraulic, slip-controlled braking system. To enable producing the piston pump inexpensively, a bush is made without undercuts as an upset part integrally with a bottom which has a valve seat for the outlet valve of the piston pump.

11 Claims, 2 Drawing Sheets

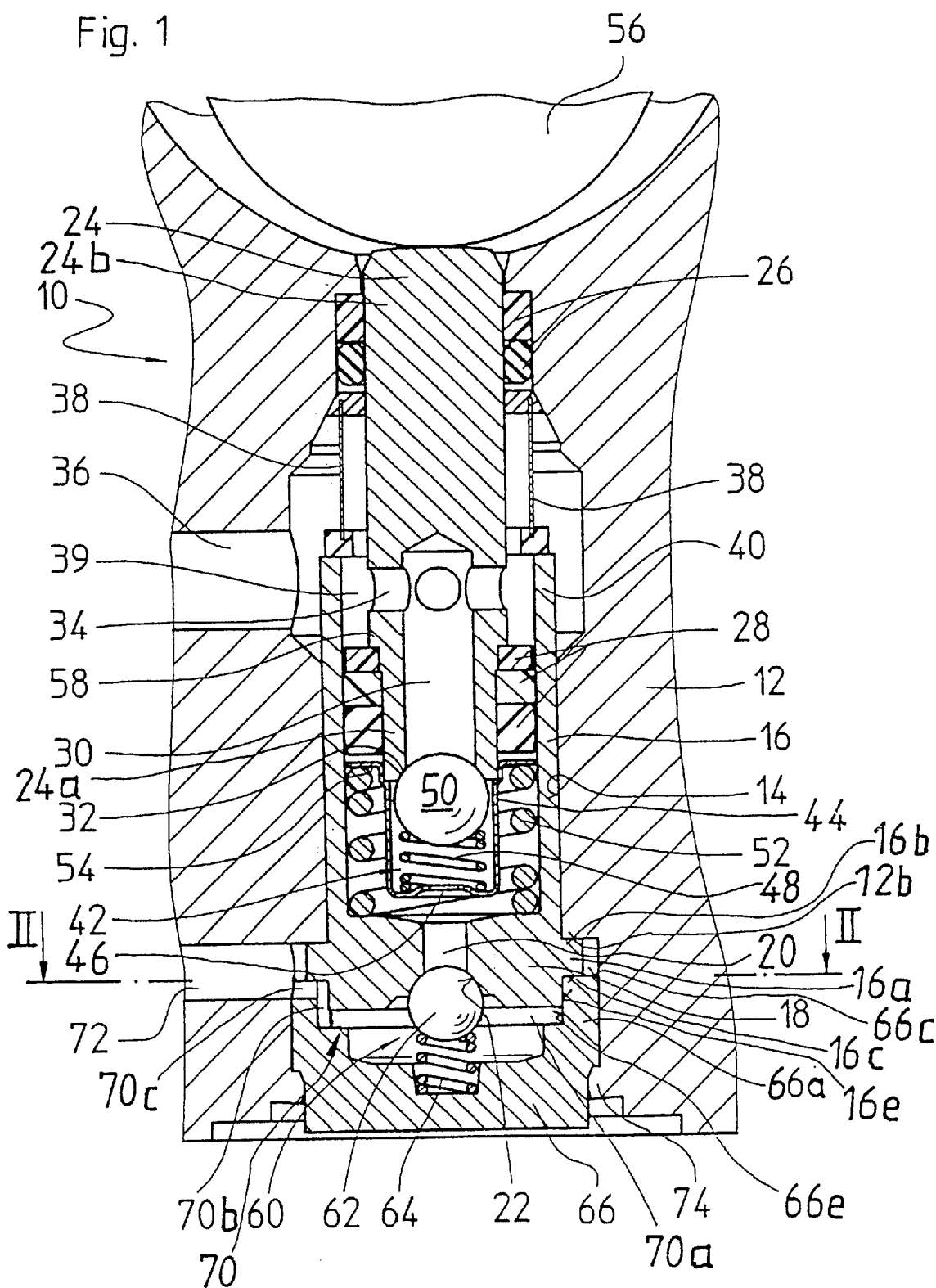

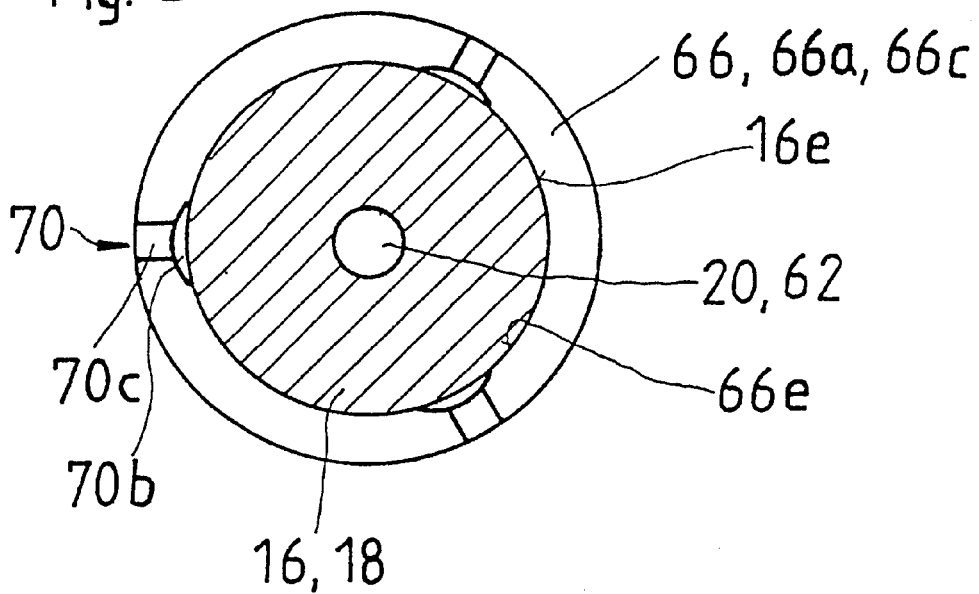

PISTON PUMP FOR A VEHICLE BRAKE SYSTEM

PRIOR ART

The invention relates to a piston pump for a vehicle brake system.

One such piston pump is known from German Patent Disclosure DE 41 07 979 A1. The known piston pump has a piston which can be driven to a reciprocating stroke motion by an eccentric element which can be driven to rotate. The piston is axially displaceably guided in a bush which is screwed into a cylinder bore of a pump housing. On the bush of the known piston pump is a turned part which is geometrically complicated in form and complex to produce, having a graduated inner bore with an undercut, having undercuts, and having a radially protruding collar on the outside which is threaded for being screwed into the cylinder bore, and having transverse bores as inlet and longitudinal bores for engagement by a screwdriving tool.

ADVANTAGES OF THE INVENTION

The piston pump of the invention claim has a bush made by a deforming operation, preferably cold forming, such as upsetting. The invention has the advantage that the bush can be made quickly and inexpensively in one or more steps.

Another advantage is that inserting the bush into the cylinder bore of the pump housing is simplified.

A press fit brings about sealing between the bush and the cylinder bore, so that such separate sealing means as sealing rings become unnecessary.

According to the invention, the bush of the piston pump of the invention has a bottom that is integral with it, which lends the bush greater stability and increases the resistance of the bush to unintended deformation, particularly on being pressfitted into the pump housing or if a closure part is pressed on it.

The bottom of the bush is preferably provided, with a through hole and a valve seat for an inlet or outlet valve of the piston pump at an orifice of the through hole. The through hole and the valve seat can advantageously be manufactured in this way in a single operation along with the production of the bush by deforming. Another advantage of this feature of the invention is the elimination of a separate valve seat carrier part, and that the piston pump is compact and short in the axial direction.

In a piston pump, a closure part, which closes the cylinder bore in pressure tight fashion on the side of a positive-displacement chamber, is firmly joined to the bush, for instance by press-fitting of the bush into the closure part, and secured in pressure-tight fashion in the pump housing by a caulking. The closure part can be made simply and quickly, like the bush, as a deformed part. Caulking the closure part and the housing allows a radial offset compensation, in order to avoid overdetermination in mounting the bush with the closure part fixed firmly to it in the cylinder bore of the pump housing. A further advantage is the elimination of a sealing ring or the like between the closure part and the bush, because the sealing is effected by the press fit between these two parts.

A flow conduit particularly as a pump outlet is realized by a groove extending from the inside outward, which is made in faces oriented toward one another of the closure part or the bush. This has the advantage that the groove in the closure part or the bush, which is open toward the bush or the closure part, as applicable, which when the closure part is pressed onto the bush is covered by the bush or a bottom of the bush or by the closure part to form a flow conduit, can be manufactured in a single operation together with the production of the closure part or the bush by deforming.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF THE DRAWINGS

The invention will be described in further detail below in terms of an exemplary embodiment shown in the drawing. FIG. 1 shows an axial section through a piston pump of the invention; and FIG. 2 is a radial section taken along the line II—II of FIG. 1.

DESCRIPTION OF THE EXEMPLARY EMBODIMENT

The piston pump of the invention, identified overall by reference numeral 10 and shown in the drawing, is accommodated in a hydraulic block which forms a pump housing 12. Other components, not shown, such as magnet valves, hydraulic reservoirs and dampers of a hydraulic, slip-controlled vehicle brake system are accommodated and hydraulically connected to one another and to the piston pump 10 in the hydraulic block.

The piston pump 10 is inserted into a continuous, stepped installation space 14 in the pump housing 12. The installation space provided in the pump housing 12 is preferably made by a material-removing process, such as drilling. The piston pump 10 has a bush 16, inserted into the installation space 14, which is sealed off in the pump housing 12 by a press fit between the outer circumference of the bush 16 and the inner circumference of the installation space 14. The bush 16 is an upset part; it is embodied hollow-cylindrically and has no undercuts whatever so as to make it simple to produce by deforming. In the exemplary embodiment shown, the bush 16 is an upset part. The bush 16 is provided integrally with a bottom 18, which has a center hole 20 at whose outward-pointing orifice a conical valve seat 22 is formed.

A boltlike, cylindrical piston 24 is received in the bush 16. The piston 24 is guided axially displaceably. The piston 24 has a first end 24a, which is located inside the bush 16, and a second end 24b protruding out from the bush 16. For axial guidance, the piston pump 10 of the invention has a sealing and guide ring package 26 on the end 24b of the piston 24 protruding from the bush 16, that is, the end inserted into the installation space 14. On the other end 24a of the piston 24 located inside the bush 16, a further sealing and guide ring package 28 is provided. The sealing and guide ring package 26 guides the first end 24a in the bush 16, and the sealing and guide ring package 28 guides the second end 24b directly in the pump housing 12.

On a side of the piston 24 toward the bottom 18 of the bush 16, an axial blind bore 30 is made in the piston 24, whose orifice is embodied as a conical valve seat 32. Two transverse bores 34 intersecting one another at right angles in the piston 24 intersect the blind bore 30 at its bottom.

An inflow to the piston pump 10 of the invention is effected through a first conduit 36, discharging radially into the installation space 14, of the pump housing 12, through which the fluid to be pumped reaches the installation space 14 and passes through a hollow-cylindrical filter screen 38. The filter screen is disposed in the extension of the bush 16 in the installation space 14, from an open face end of the bush 16 into a jacket chamber 39 between the bush 16 and the piston 24. The sealing and guide ring packages 26 and 28 define the jacket chamber 39 in the axial direction. The inflow is accordingly effected around a free end edge 40 of the bush 16 and then axially into the bush. It thus becomes unnecessary to provide a transverse bore in the bush 16 as a fluid inlet. From the jacket chamber 39 between the bush 16 and the piston 24, the fluid to be pumped flows through the transverse bore 34 into the axial blind bore 30 of the piston 24.

On the end 24a of the piston 24 toward the bottom 18 of the bush 16, a check valve is mounted as an inlet valve 42. The inlet valve 42 has a cup-shaped valve housing 44, which is made as a sheet-metal deep-drawn part with one or more openings 46. Supported on the valve housing 44 is a helical compression spring as the valve closing spring 48, which presses a valve ball 50 against the valve seat 32 formed on the piston 24.

A piston restoring spring 52 embodied as substantially stronger than the valve closing spring 48 is supported on the inside on the bottom 18 of the bush 16 and presses against a radial flange 54, which is integral with the valve housing 44, and in this way keeps the valve housing 44 on the piston 24 and furthermore presses the piston 24 to contact a circumferential face of an eccentric element 56, which can be driven to rotate and is disposed on a face end, remote from the inlet valve 42, of the end 24b of the piston 24 and serves in a manner known per se to drive the piston 24 to execute a reciprocating stroke motion. The sealing and guide ring package 28 on the end of the piston 24 located inside the bush 16 is held in the axial direction between an annular shoulder 58 of the piston 24 and the radial flange 54 of the valve housing 44.

As its outlet valve 60, the piston pump 10 of the invention has a check valve with a valve ball 62, which is pressed by a helical compression spring, as the valve closing spring 64, against the valve seat 22 on the bottom 18 of the bush 16. The valve closing spring 64 is supported on a closure part 66, which is cup-shaped and is press-fitted onto the bottom 18 of the bush 16; a circumferential wall 66a of the closure part 66 grips the bottom 18 of the bush 16.

A second conduit 72 provided in the pump housing 12 and discharging into the installation space 14 carries the fluid to be pumped through the pump housing 12 to lines that lead onward, which have not been shown for the sake of simplicity. A flow conduit 70 carries the fluid from the outlet valve 60 to the second conduit 72. In the preferably selected exemplary embodiment, the flow conduit 70 is composed of a disk-shaped interstice 70a, at least one axial groove 70b, and at least one radially extending groove 70c. Preferably, there are three axial grooves 70b and correspondingly three radially extending grooves 70c (FIG. 2).

On the outer circumference of the bush 16, there is a radially protruding projection 16a (FIG. 1) extending all the way around. The projection 16a of the bush 16 has a shoulder 16b on its face end, oriented into the interior of the pump housing 12, and an outward-pointing shoulder 16c on the face end. The shoulder 16c on the face end is adjoined by a cylindrical jacket face, provided on the outer circumference of the bush 16, of a shoulder 16e of the bush 16. The closure part 66 has an inward-opening cylindrical shoulder 66e. The cylindrical shoulder 66e forms the inner jacket face of the circumferential wall 66a. The installation space 14 has a stepped, cylindrical form with an outward-pointing shoulder 12b on the face end.

The outside diameter of the cylindrical shoulder 16e of the bush 16 is adapted to the inside diameter of the cylindrical shoulder 66e of the closure part 66 in such a way that by exerting a certain force, easily brought to bear with a tool, the bush 16 and the closure part 66 can be put together. The press fit then created between the two cylindrical shoulders 16e and 66e assures that the bush 16 and the closure part 66 will hold together firmly. This makes it possible to assemble the bush 16, closure part 66 and outlet valve 60 outside the pump housing 12, without having to fear that these parts will fall apart while they are being installed in the pump housing 12. This substantially facilitates the overall assembly of the piston pump 10.

On the circumferential wall 66a of the closure part 66, there is an end face of a shoulder 66e that extends radially and points inward, that is, in the direction of the eccentric element 66. The bush 16 and the closure part 66 can be put together far enough that the face-end shoulder 66c of the closure part 66 comes to contact the face-end shoulder 16c of the bush 16.

The preassembled unit including the bush 16, closure part 66 and outlet valve 60, is inserted, preassembled, into the installation space 14, until the shoulder 16b of the bush 16 comes to contact the shoulder 12b of the pump housing 12.

Viewed in the axial direction, the cylindrical shoulder 16e of the bush 16 is shorter than the cylindrical shoulder 66e of the closure part 66. As a result, between the outward-pointing face end of the bottom 18 of the bush 16 and an opposed indented face on the face end of the closure part 66, the aforementioned disk-shaped interstice 70a of the flow conduit 70 is created.

On the face-end shoulder 66c, as FIG. 2 shows, three radially extending indentations are provided, which form the aforementioned radially extending grooves 70c of the flow conduit 70.

Angularly corresponding with the grooves 70c, indentations which viewed end on are crescent-shaped are provided in the cylindrical shoulder 66e of the closure part 66. These indentations form the aforementioned axial grooves 70b. Viewed in the axial direction, the grooves 70b have the same radial depth throughout.

The proposed course of the flow conduit 70 between the bush 16 and the closure part 66 has the advantage that a radial bore need not be made in either the bush 16 nor the closure part 66. Such a bore would be problematic from an engineering standpoint and would mean increased production cost. Because the bush 16 or closure part 66 is preferably made as a deformed part, particularly an upset part, it is easily possible to make indentations on the face end into these parts, so that the flow conduit 70 can be produced thereby without significant additional expense. Since at least the bush 16 and/or the closure part 66 is made by plastic deforming, preferably upsetting, the flow conduit 70 can be made in a single step together with the bush 16, or together with the closure part 66.

Once the closure part 66 has been installed jointly with the bush 16 in the installation space 14, the pump housing 12 is plastically deformed in the region of the edge surrounding the installation space 14, creating a caulking 74 that securely restrains the valve seat 66 and the bush 16 in the installation space 14. The caulking 74 also creates sealing between the closure part 66 and the pump housing 12, so that the fluid cannot escape to the outside from the installation space 14. Furthermore, the caulking 74 compensates for any possible radial offset of the closure part 66 with respect to the installation space 14 that can be due to the radially nondisplaceable press-fitting of the closure part 16 onto the bush 16 and the press-fitting of the bush 16 into the installation space 14.

For high wear resistance, the bush 16 is hardened. The hardening is preferably done by the nitriding process, which makes hardening without warping possible.

In the exemplary embodiment selected as preferably for the description and the drawing, the inlet valve 42 and the outlet valve 60 are disposed such that the fluid is pumped by the piston pump 10 out of the first conduit 36 into the second conduit 72. It should also be noted that the valves 42 and 60 can also be disposed such that the piston pump 10 has a flow through it in the reverse direction; that is, that the piston pump 10 aspirates the fluid from the conduit 72 and then pumps it into the conduit 36. In this modification of the piston pump 10, the inlet and outlet valves are transposed, and the flow conduit 70 is located on the inlet side upstream of the inlet valve of the piston pump.

The foregoing relates to a preferred exemplary embodiment of the invention, it being understood that other variants and embodiments thereof are possible within the spirit and scope of the invention, the latter being defined by the appended claims.

What is claimed is:

1. A piston pump comprising a piston that is driven to execute a reciprocating stroke motion and is axially displaceably received in a bush which is inserted into an installation space in a pump housing, the bush (16) being formed substantially solely by means of an upsetting operation.

2. The piston pump according to claim 1, in which the bush (16) is a cold deformed part, in particular an upset part.

3. The piston pump according to claim 1, in which the bush (16) is hardened, especially nitride-hardened.

4. The piston pump according to claim 1, in which the bush (16) has a bottom (18) integral with it.

5. The piston pump according to claim 4, in which the bottom (18) of the bush (16) has a through hole (20) and a valve seat (22).

6. A piston pump comprising a pump housing, a piston that is driven to execute a reciprocating stroke motion and is axially displaceably received in a bush which is inserted into an installation space in said pump housing, a closure part, which is inserted into said housing sealing off an installation space, the closure part (66) is joined to the bush (16), and that the closure part (66) is held and sealed off in the installation space (14) by caulking (74).

7. The piston pump according to claim 6, in which the closure part (66) is joined to the bush (16) by a press fit.

8. The piston pump according to claim 6, in which the closure part (66) is a cold deformed upset part.

9. The piston pump according to claim 6, in which the piston pump (10) has a flow conduit (70), between the closure part (66) and the bush (16), which is formed by a groove in the closure part (66) and/or in the bush (16).

10. The piston pump according to claim 1, in which the bush (16) has substantially no constrictions which interfere with the forming of the bush by the upsetting operation.

11. A piston pump comprising a piston that is driven to execute a reciprocating stroke motion and is axially displaceably received in a bush which is inserted into an installation space in a pump housing, and the bush (16) is a deformed part, in which the bush (16) has substantially no constriction which interferes with the forming of the bush by an upsetting operation.

* * * * *

UNITED STATES PATENT AND TRADEMARK OFFICE
CERTIFICATE OF CORRECTION

PATENT NO.    : 6,283,733 B1
DATED         : September 4, 2001
INVENTOR(S)   : Dieter Merklein et al.

It is certified that error appears in the above-identified patent and that said Letters Patent is hereby corrected as shown below:

<u>Title page,</u>
Item [54], should read as follows;
-- [54] PISTON PUMP FOR USE IN A SLIP-CONTROLLED VEHICLE BRAKE SYSTEM --

Signed and Sealed this

Sixteenth Day of April, 2002

*Attest:*

JAMES E. ROGAN
*Attesting Officer*    *Director of the United States Patent and Trademark Office*